(12) United States Patent
Bendorf

(10) Patent No.: US 11,148,271 B2
(45) Date of Patent: Oct. 19, 2021

(54) HAMMER HEAD WITH INTERFERENCE FIT

(71) Applicant: Snap-on Incorporated, Kenosha, WI (US)

(72) Inventor: Scott A. Bendorf, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 281 days.

(21) Appl. No.: 16/204,395

(22) Filed: Nov. 29, 2018

(65) Prior Publication Data
US 2020/0171641 A1 Jun. 4, 2020

(51) Int. Cl.
*B25D 1/12* (2006.01)
*B25D 1/14* (2006.01)
*B25D 1/02* (2006.01)
*F16B 11/00* (2006.01)

(52) U.S. Cl.
CPC ............... *B25D 1/12* (2013.01); *B25D 1/02* (2013.01); *B25D 1/14* (2013.01); *F16B 11/002* (2013.01)

(58) Field of Classification Search
None
See application file for complete search history.

(56) References Cited

U.S. PATENT DOCUMENTS

| | | | |
|---|---|---|---|
| 1,463,167 A | 7/1923 | Keyes | |
| 1,493,055 A | 5/1924 | Swangren | |
| 1,543,457 A | 6/1925 | Swangren | |
| 2,008,352 A | 7/1935 | Fegley et al. | |
| 2,737,216 A | 3/1956 | Kenerson | |
| 3,322,172 A | 5/1967 | Small | |
| 5,012,702 A | 5/1991 | Taylor | |
| 5,458,840 A | 10/1995 | Carmien | |
| 5,916,338 A | 6/1999 | Bergkvist et al. | |
| 6,052,885 A | 4/2000 | Carmien | |
| 6,595,087 B2 | 7/2003 | Whalen et al. | |
| 7,168,338 B2 | 1/2007 | Hopper, Jr. et al. | |

FOREIGN PATENT DOCUMENTS

| | | |
|---|---|---|
| CH | 584093 | 1/1977 |
| CN | 204686825 U | 10/2015 |
| DE | 2543204 A1 | 3/1977 |

(Continued)

OTHER PUBLICATIONS

JP 4835885 Machine Translation (Year: 1973).*

(Continued)

*Primary Examiner* — Brian D Keller
(74) *Attorney, Agent, or Firm* — Seyfarth Shaw LLP

(57) ABSTRACT

A dead blow hammer head with end caps coupled to a central body through an interference fit. The ends of the body can be flared axially and radially outward and interference fit with the recesses to maximize the surface area overlap between the ends of the body and the recesses. By maximizing the surface area overlap, stress concentrations and failure are reduced. The hammer head can also include a shot or other mass that is unobstructed by screws or pins due to the interference fit of the hammer head components. The interference fit can become stronger during use with each impact further solidifying the surface area overlap between the ends and central portion of the hammer head.

9 Claims, 4 Drawing Sheets

(56) References Cited

FOREIGN PATENT DOCUMENTS

| | | |
|---|---|---|
| EP | 0204533 | 12/1986 |
| FR | 1121758 A | 8/1956 |
| FR | 1382408 | 12/1963 |
| FR | 2088164 | 1/1972 |
| GB | 2319000 | 5/1998 |
| JP | S4835885 U | 4/1973 |
| JP | 2002086369 | 3/2002 |
| WO | 2006057757 A1 | 6/2006 |

OTHER PUBLICATIONS

Canadian Office Action for Application No. 3,047,789 dated Jul. 22, 2020, 4 pages.
Australian Examination Report No. 2 for Application No. 2019204028 dated Oct. 27, 2020, 6 pages.
Examination Report No. 1 for Application No. 2019204028 dated Apr. 22, 2018, 8 pages.
United Kingdom Combined Search and Examination Repod for Application No. GB1908166.0, dated Nov. 27, 2019, 6 pages.
Taiwan Office Action for Application No. 108132392 dated Jul. 2, 2020, 10 pages.
Examination Report for Application No. GB1908166.0 dated Jan. 20, 2021, 4 pages.
Canadian Office Action for Application No. 3,047,789 dated Mar. 5, 2021, 3 pages.
Taiwan Office Action for corresponding Taiwan Application No. 108132392 dated Apr. 6, 2021, 4 pages.
Australian Office Action for corresponding Australian Application No. 2019204028 dated Apr. 7, 2021, 5 pages.
United Kingdom Office Action for corresponding United Kingdom Application No. 1908166.0 dated May 7, 2021, 4 pages.

* cited by examiner

HAMMER HEAD WITH INTERFERENCE FIT

TECHNICAL FIELD OF THE INVENTION

The present invention relates generally to hammer heads. More particularly, the present invention relates to hammer heads with end caps coupled to a body with an interference fit.

BACKGROUND OF THE INVENTION

Hammer heads are well known tools for striking a work piece. Hammer heads are coupled to the end of a handle and swung towards the work piece. A hammer head can include a striking face that strikes the work piece and, upon impact, drives the work piece into a working surface. The force felt by the user upon impact is often referred to as a "rebound" that skilled artisans have worked to dampen.

Dead blow hammer heads often include a mass inside the hammer head that dampens the rebound force of the hammer. For example, dead blow hammer heads can include a "shot" or another mass that is capable of flowing so as to absorb the impact of the hammer. Because of this internal mass, the hammer head must be assembled as opposed to cast as a single, unitary hammer head. Assembling multiple components, however, results in stress concentrations where the components meet. Conventional hammer heads also include areas where the components can be separated from one another if an adequate coupling mechanism is not used. Conventional dead blow hammer heads include screws or through pins to couple the objects together.

SUMMARY OF THE INVENTION

The present invention broadly comprises a dead blow hammer head with end caps coupled to a central body through a flared interference fit. The ends of the body can be flared axially and radially outward and interference fit with recesses in both the front and rear end caps. The interference fit maximizes the surface area overlap between the ends of the body and the recesses, limiting the stress concentrations and reducing areas where the hammer head could come apart. A shot or other mass could also be implemented within the hammer head without obstructions such as screws or through pins. The interference fit can also become stronger during use, with the force and impact during use causing a tighter interference fit.

In particular, the present invention broadly comprises a hammer head including a front end cap having first and second front end cap ends opposite one another, and a front recess extending radially and axially outward and being located between the first and second front end cap ends. Further included is a rear end cap having first and second rear end cap ends opposite one another, and a rear recess extending radially and axially outward and being located between the first and second rear end cap ends. A body can be provided with first and second body ends. The first body end is interference fit within the front recess and the second body end is interference fit within the second recess.

The present invention can further include a hammer head including a front end cap having a front recess extending radially and axially outward, a rear end cap having a rear recess extending radially and axially outward, and a body having first and second body ends interference fit with the front and rear recesses, respectively.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
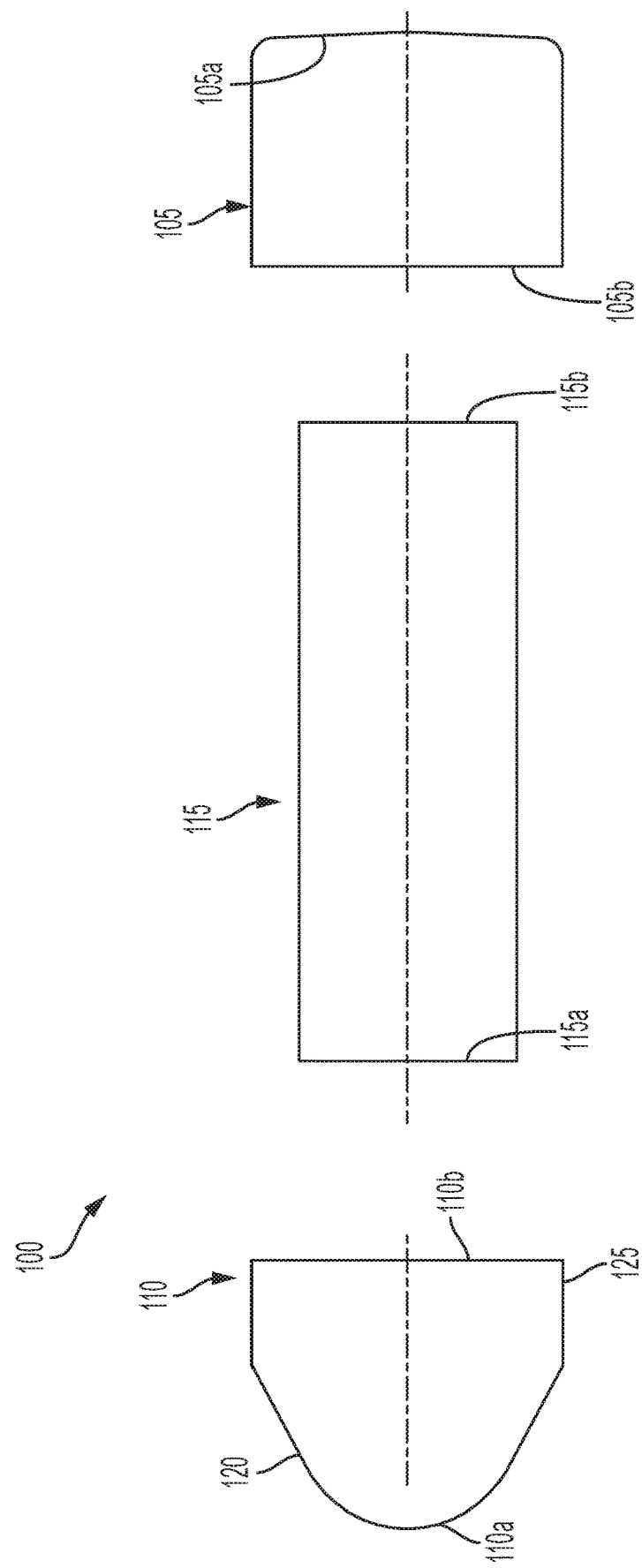
FIG. 1 is an exploded front view of a hammer head according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a dead blow hammer head that utilizes an interference fit to better couple end caps to a central body. The body can have ends that are flared axially and radially outward and insert into corresponding recesses in the end caps. The coupling between the ends and recesses can be an interference fit to maximize the surface area overlap between the ends of the body and the recesses. By maximizing the surface area overlap in the coupling, stress concentrations are reduced and failure is minimized. A shot or other mass could also be provided inside the hammer head and can flow freely within the hammer head to limit the rebound from the hammer head upon impact. In this manner, the force and impact during use of the hammer head can cause a tighter interference fit and reduce or minimize failure.

Figure 2:
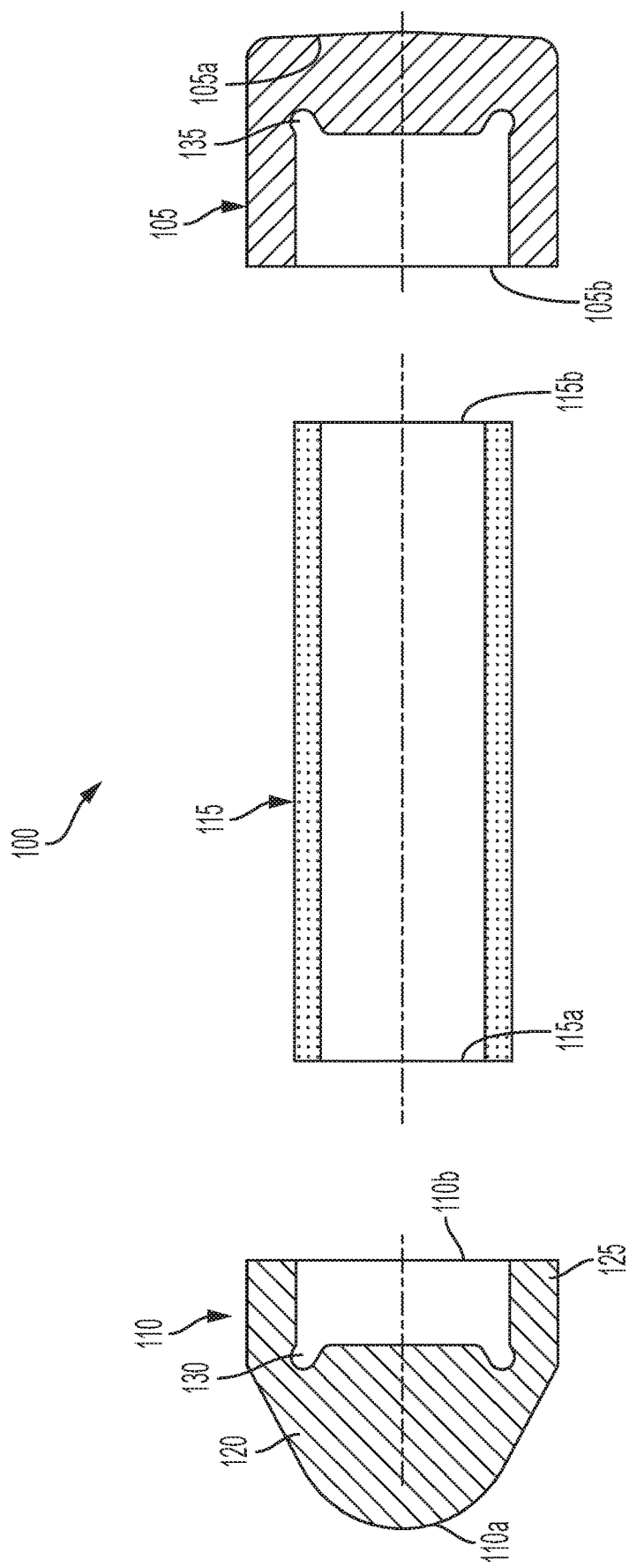
FIG. 2 is an exploded sectional front view of a hammer head according to at least some of the presently disclosed embodiments.
Figure 3:
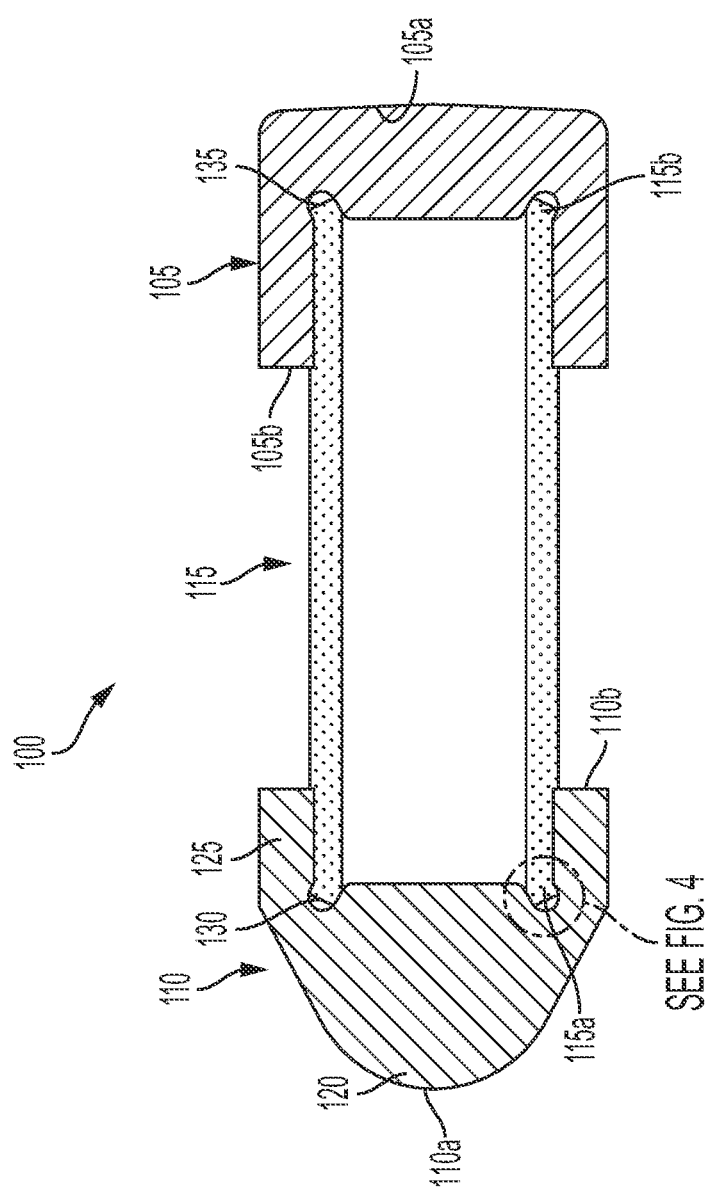
FIG. 3 is an assembled sectional front view of a hammer head according to at least some of the presently disclosed embodiments.
Figure 4:
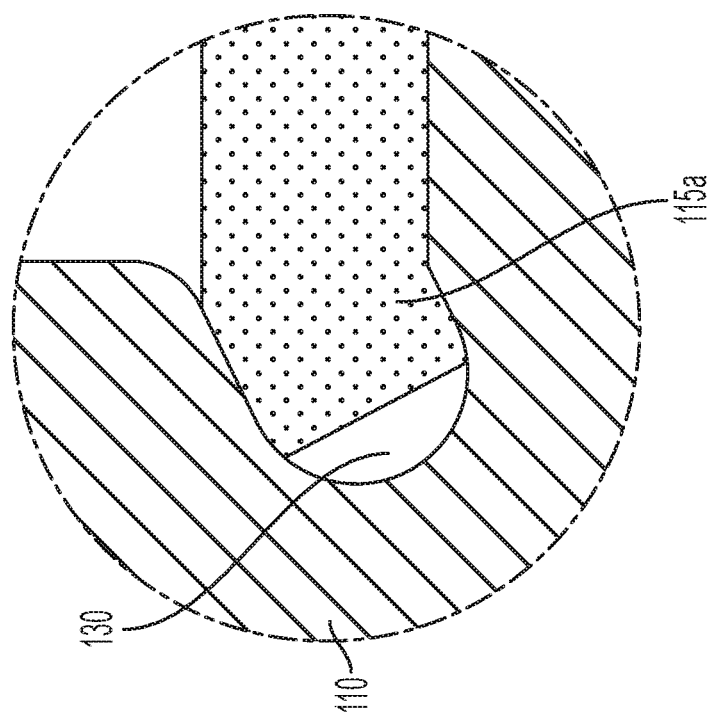
FIG. 4 is an enlarged partial sectional view of an end of a body being inserted into a recess according to at least some of the presently disclosed embodiments.

Referring to FIGS. 1-4, a hammer head 100 can include a front end cap 105 coupled to a rear end cap 110 by a body 115. The front end cap 105 can have a front striking end 105*a* and a front mating end 105*b* opposite the front striking end 105*a*. Similarly, the rear end cap 110 can include a rear striking end 110*a* and a rear mating end 110*b* opposite the rear striking end 110*a*. The body 115 can include terminal ends, such as a rear body end 115*a* facing the rear mating end 115*b* and a front body end 115*b* opposite the rear body end 115*a* and facing the front mating end 105*b*.

The front end cap 105 is generally the end cap that is used for striking a work piece and driving the work piece into a working surface. For example, the front end cap 105 can include the front striking end 105*a* as the striking surface of the hammer head 100.

The rear end cap 110 can provide a rear enclosure for the hammer head 100 and can further provide additional weight to help drive the work piece. Further, in some embodiments, the rear end cap 110 can include a pointed portion 120 and a base portion 125 supporting the pointed portion 120. The pointed portion 120 can also be used to drive work pieces in situations where a work piece is located within a recess or in situations in which a ball point hammer or similar tool would be used.

The body 115 is the connecting portion between the front 105 and rear 110 end caps. The rear 115a and front 115b body ends can be interference fit within portions of the front 105 and rear 110 end cap to couple the hammer head 100 together. The body 115 can be a cylinder, a hollow prism, or any shape that corresponds to the cross-sectional shape of the front 105 and rear 110 end caps, for example.

In an embodiment, the front 105 and rear 110 end caps can respectively include front 135 and rear 130 recesses. The recesses 130, 135 provide an area for the ends of the body 115 to interference fit within. For example, and as shown, the rear 130 and front 135 recesses can extend axially and radially outward and respectively receive the rear body end 115a and the front body end 115b. The rear body end 115a and the front body end 115b can therefore be flared axially and radially outward and interference fit within the rear 130 and front 135 recesses, respectively. The front 135 and rear 130 recesses can be indents within the front 105 and rear 110 end caps that extend circumferentially around the interior of the front 105 and rear 110 end caps, respectively. The recesses 130, 135 can further be any other shape or size that allow an interference fit with the body ends 115a, b.

By providing an interference fit, the interface between the body 115 and the end caps 105, 110 can be stronger and less susceptible to failure. For example, the interface can have greater overlap in surface area between the recesses 130, 135 and the ends 115a, 115b inserted into the recesses 130, 135. This overlap in surface area reduces stress concentrations and limits the potential for failure, for example the separation of the end caps 105, 110 from the body 115. The interference fit also allows the user to strengthen the coupling between the end caps 105, 110 and the body 115 with each strike of the hammer by driving the end caps 105, 110 and body 115 closer together. Additionally, a shot can flow unimpeded within the hammer head 100 due to the lack of any need to include screws or connecting pins, as with prior art hammer heads.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A hammer head comprising:
a front end cap having opposing first and second front end cap ends, a first cavity extending from the second front end cap end into the front end cap towards the first front end cap end, and a front recess disposed circumferentially around an interior of the first cavity proximal to a bottom of the first cavity and extending radially and axially outwardly;
a rear end cap having opposing first and second rear end cap ends, a second cavity extending from the second rear end cap end into the rear end cap towards the first rear end cap end, and a rear recess disposed circumferentially around an interior of the second cavity proximal to a bottom of the second cavity and extending radially and axially outwardly; and
a body having first and second body terminal ends respectively disposed in the first and second cavities, wherein the first and second body terminal ends are flared radially and axially outwardly and respectively interference fit within the front and rear recesses, and the interference fit between the front end cap and the body is strengthened by driving the first body terminal end further into the front recess when the front end cap is struck.

2. The hammer head of claim 1, wherein the body is hollow.

3. The hammer head of claim 2, wherein the body is a cylinder.

4. The hammer head of claim 1, wherein the rear end cap includes a pointed portion supported by a base portion, the pointed portion is located proximate the first rear end cap end.

5. A hammer head comprising:
a front end cap having a front recess extending circumferentially around an interior of the front end cap and radially and axially outwardly;
a rear end cap having a rear recess extending circumferentially around an interior of the rear end cap and radially and axially outwardly; and
a body having first and second body terminal ends that are flared radially and axially outwardly and respectively interference fit with the front and rear recesses, and the interference fit between the front end cap and the body is strengthened by driving the first body terminal end further into the front recess when the front end cap is struck.

6. The hammer head of claim 5, wherein the front recess is located between first and second opposing first end cap ends of the first end cap, and the rear recess is located between first and second opposing rear end cap ends of the second end cap.

7. The hammer head of claim 5, wherein the body is hollow.

8. The hammer head of claim 7, wherein the body is a cylinder.

9. The hammer head of claim 5, wherein the rear end cap includes a pointed portion supported by a base portion, the pointed portion being located proximate the first rear end cap end.

* * * * *